May 16, 1933. G. E. GAGNIER ET AL 1,908,837
GLARE SHIELD FOR AUTOMOTIVE VEHICLES
Filed March 12, 1930
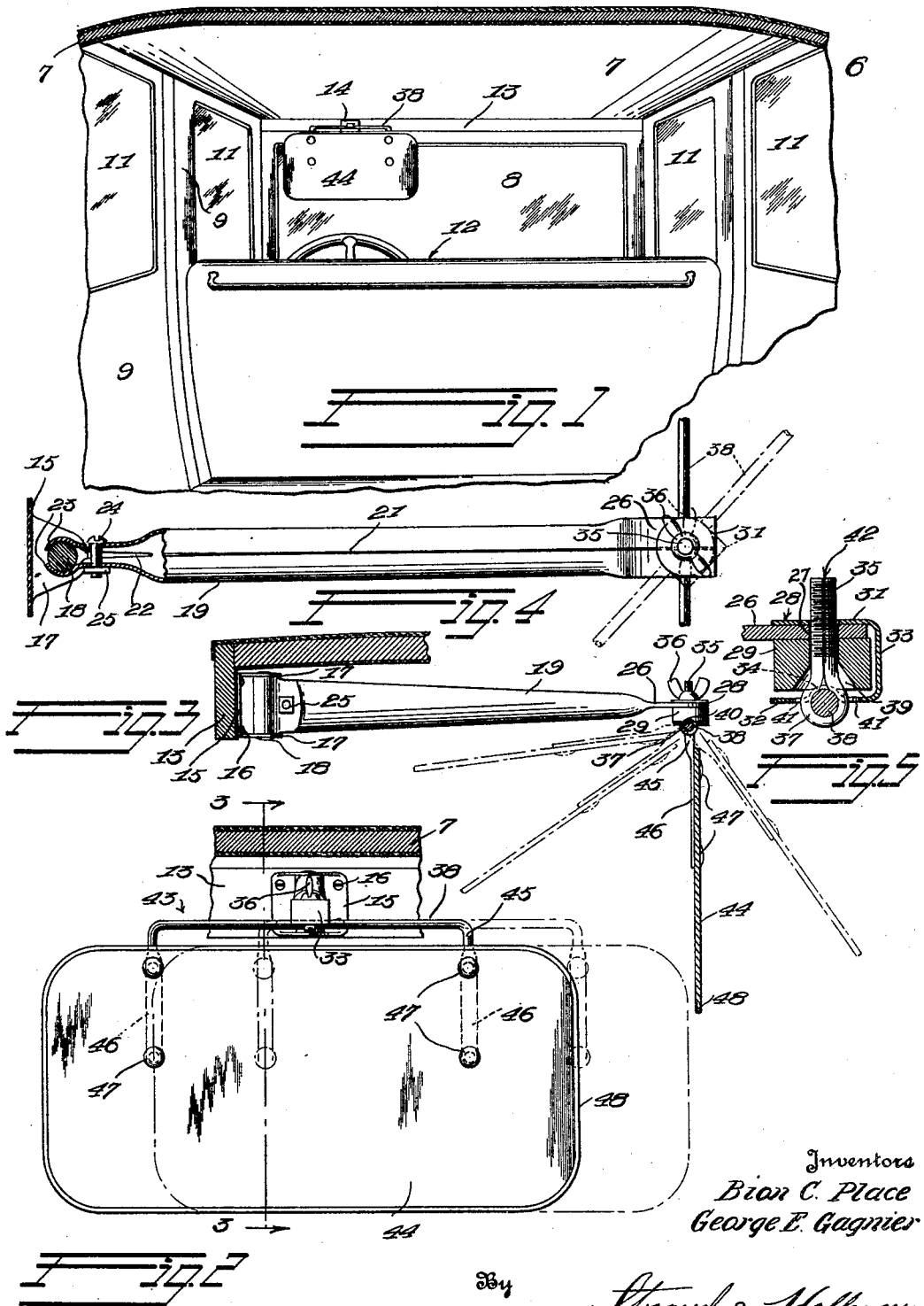
Inventors
Bion C. Place
George E. Gagnier
By
Strauch & Hoffman
Attorneys

UNITED STATES PATENT OFFICE

GEORGE E. GAGNIER AND BION C. PLACE, OF DETROIT, MICHIGAN

GLARE SHIELD FOR AUTOMOTIVE VEHICLES

Application filed March 12, 1930. Serial No. 435,200.

This invention relates to a glare shield or visor of the type intended for mounting within the body of an automotive vehicle at the top of, or adjacent to, the windshield, and of the type that is intended to present a barrier to blinding rays from the sun or an artificial source of light without shutting off the necessary view of the road, directly in front of and adjacent the vehicle, from the eyes of the operator. More specifically, the device of this invention is of the type wherein a shielding element is mounted in spaced relation from the windshield by an arm or the like and adapted to be adjusted to a multiplicity of varying angular positions.

Glare shields of this general character heretofore have been proposed for similar purposes, but they have not been adopted for general use by the public, mainly because they have been ineffective to properly serve their intended function, and too complex and expensive. It has been common in prior devices of this nature to mount transparent shields, such as colored glass or celluloid, directly between the driver's eyes and the source of glaring light. Shields of such character diminish the light intensity but in so doing they obscure the roadway directly in front of the shield-equipped vehicle, so that the driver loses a clear unobstructed view of the same and is apt to run off the roadway, or to collide with slow-moving and parked vehicles or any pedestrians immediately ahead of his automobile. When such transparent shields are made so small as to eliminate this danger, their shielding areas are insufficient and the driver must frequently remove one hand from the controls in order to readjust the shield to a position between his eyes and the moving source of light. Moreover, these transparent devices are subject to cracking and breaking when they are grasped for rapid manipulation by the driver, and the colored light passing from them fatigues the driver's eyes and constantly annoys him.

Aside from the nature of the shielding panel itself, various types of cumbersome, complex and costly panel supporting structures have been proposed, some of which embody a plurality of arms that permit several adjustments of the shielding panel but that permit the panel, upon vibration and jarring of the vehicle, to accidentally assume unintended positions unless the adjusting elements are permanently locked after each adjustment thereof. It is essential, however, to the utility and practicability of a mounted glare shield, that it may be quickly and easily manipulated into any selected one of a large number of positions and thereafter maintained in said position without further ado on the part of the operator of the vehicle.

Accordingly, it is a primary object of our invention to overcome all of the above enumerated defects and disadvantages of prior sun and glare shields.

It is an object of this invention to provide an opaque glare shield and to mount it in spaced relation to the windshield in such manner that it shall serve as a positive barrier to light rays without shutting off the necessary view of the road from the eyes of the driver.

A further object is to mount an opaque glare shield above the windshield in such manner that the glare shield may be swung and adjusted into position adjacent the left side of the driver to shield him from the sun's rays.

Another object of this invention lies in the provision of means for spacing a shielding panel from the top of the windshield and permitting said panel to be adjusted to an infinitely variable number of positions between the plane of the top and a horizontal plane substantially at the level of the eyes of the driver, while positively preventing the panel from assuming a position in which any portion thereof projects below the latter plane.

A still further object consists in providing a single and horizontal shield-supporting arm that may be adjusted in a horizontal plane about a vertical axis upon which it is frictionally pivoted at the top of the windshield.

Another major object of our invention resides in the provision of a device for connecting a shielding panel to a supporting element in such manner that any one or all of a plurality of oscillatory and translatory panel adjustments may be effected, to wit: Oscillation of the panel as a body about a vertical line passing through the connecting device; oscillation of the panel bodily about a horizontal axis passing through said connecting device; sliding movement of the panel unit along a horizontal axis passing through the connecting device; and all this in addition to swinging of the supporting element in a horizontal plane about a vertical axis.

It is also an object of this invention to provide a simple compact and inexpensive device for connecting a panel or the like to a supporting element which device involves several simple parts including a clip that may serve one or all of such functions as locking some of the parts together, holding some of the parts in frictional engagement, acting as an ordinary washer and performing the functions of a spring washer.

Further objects are to design a simple supporting arm that may be cheaply formed from sheet metal, and to manufacture an inexpensive opaque shielding panel from a thin sheet of light material such as fibre board.

Other objects of the invention will appear from a study of the following detailed description when taken in connection with the accompanying drawing, in which:

Figure 1 is a view seen when looking forwardly into the front end of a vehicle body, and showing the relative proportions of the device of this invention and the preferred manner of mounting it.

Figure 2 is a detailed front elevational view of the glare shield of Figure 1, attached to a fragmentary portion of the vehicle body.

Figure 3 shows, partly in section and partly in side elevation, the appearance of the glare shield when viewed upon the vertical plane indicated by line 3—3 in Figure 2.

Figure 4 represents a top plan view of the supporting arm, with the bracket end thereof in partial horizontal section for clarity of detail.

Figure 5 discloses an enlarged vertical section through the device shown in Figure 3 for interconnecting the panel and the end of the supporting arm, with the locking and adjusting nut removed.

With reference now to the above described figures, in which like characters designate like parts, numeral 6 indicates generally a conventional automobile body having a top 7, windshield 8, doors 9 carrying windows 11, and a driver's seat 12. A rigid header bar 13 is disposed between the windshield and the top, and it is to this bar that we prefer to attach the device now to be described.

A stamped steel bracket 14 has a vertical flat portion 15 which may be secured against header bar 13 by a set of small screws 16, and a pair of integral horizontally outstanding ears 17 which receive and fixedly support the respective ends of a vertical pin 18. A horizontal supporting arm 19 has one end pivotally mounted on said pin and its other end is adapted to support a shielding panel hereinafter referred to. The arm 19 is formed from a blank comprising a strip of steel, as follows:

The edges of the strip are brought together, as at 21 (Fig. 4) to form a tubular body portion and the pivoted end of said body is slit as at 22 for a short distance directly opposite the line 21. The material between the line 21 and slot 22 is somewhat flattened and is shaped at the extreme end into substantially semi-cylindrical fingers 23 for receiving and engaging the pivot pin 18. A screw bolt 24 passes through the flattened end closely adjacent the fingers 23 to receive a nut 25 and since the slot 22 is of sufficient width to space the tips of fingers 23 from each other, the screw bolt 24 may be adjusted to vary the tension with which the fingers grip the pivot pin. This results in the provision of a frictional hinge which permits the arm to be easily swung to, and properly maintained in, any position in a horizontal plane in the angle between the windshield and the left front door. The outer or supporting end of the arm 21 is stamped and cut to provide an integral flat lug 26 having a semi-circular tip and a central hole 27 (see Fig. 5 also). Lug 26 is flattened in a plane normal to that in which the pivoted end of the arm is flattened, and when mounted it is horizontally disposed.

In the assembled position shown in Figures 2 and 3, the lug 26 projects into a U-shaped spring and locking clip 28 with its lower flat surface slidably engaging the upper flat surface of an interposed cylindrical block 29. The clip comprises a pair of horizontal and parallel legs 31 and 32 respectively, joined by an integral, flat resilient portion 33, the upper leg 31 being flat and the lower leg 32 being flat save for a convex semi-cylindrical depression 34 extending completely across its surface. The clip 28 and block 29 have vertical holes therethrough for alignment with hole 27 of lug 26, and an eye-bolt 35 has an upper threaded shank projecting freely through the aligned holes to receive a wing nut 36 or the like for drawing and maintaining the parts in assembled position. The lower end of bolt 35 has an eye in the form of a cylindrical shell 37 for slidably and pivotally receiving a cylindrical rod portion 38 of the panel yet to be described. The block 29 has an elongated recess 39 in its lower surface for receiving a portion of the eye 37, and the lower leg 32 of the clip has an elongated slot 41 which would permit the eye to be drawn upwardly therethrough but for the fact that the rod 38 passes through said eye and rests within and against the depressed portion 34 of the clip. The block 29 has, normal to the recess 39 therein, a substantially semi-cylindrical groove 40 (see Fig. 3) across its lower face for receiving and engaging the depressed portion 34 of the spring clip.

The eyebolt 35 may be cheaply manufactured, if so desired, by taking a semi-round strip of metal and clinching the flat sides thereof together as at 42 (Fig. 5), with the middle portion of the strip engaging a rod to form the eye, and thereafter forming threads upon the split shank.

The rod 38 comprises a portion of a bracket 43 which carries a substantially rectangular shielding panel 44. The rod 38 is curved at its end to merge into a pair of parallel and spaced legs 45 the ends 46 of which are flattened and attached to the panel by means of rivets 47. The panel preferably is formed from a thin and flexible, yet strong, sheet of fibrous material which may be decorated to harmonize with the interior appointments of the vehicle body or otherwise. A metal band 48, U-shaped in cross section, encircles the edges of the fibrous sheet to strengthen them and cover any uneven or rough spots and enhance its appearance.

The glare shield having been described in detail it will now be understood that the connecting device between the arm and the panel may function in the following manner:

The distance between the legs 31 and 32 of the clip 28 is slightly greater than the combined thicknesses of lug 26 and block 29, whereby a small space is left between block 29 and the flat surfaces of lower leg 32. This permits the wing nut 36 to be tightened to draw the legs 31 and 32 toward each other in opposition to the inherent resilience of the clip, thereby drawing all of the engaged surfaces of the various parts of the connection in frictional engagement. Under this condition (nut 36 properly adjusted) the panel may be grasped and tilted up or down about the axis of rod 38 to any selected position (see Fig. 3) in which it is thereafter held by frictional engagement of rod 38 with the eye 37 and with the surface of the depression 34. Or, if desired, the panel may be grasped and oscillated bodily about the vertical axis of the eyebolt 35 (see Fig. 4), after which it is maintained in position by frictional engagement of lug 26 with the lower surface of leg 31 and with the upper surface of block 29. During the latter operation the panel and complete connecting device oscillated with respect to lug 26, by virtue of rod 38 turning the eye 37 and simultaneously reacting against the depression 34 and slot 40 to oscillate the clip and the block. The wing nut was prevented from accidental rotation relative to bolt 35 during the latter operation because of the fact that the leg 31 of the clip has the added function of serving as a flat washer.

In the event that the driver wishes to adjust the panel toward the right or left independently of the arm 19, he may do so by grasping it to slide the rod 38 longitudinally of the eye 37 (see Fig. 2). It may be found necessary, in making this last adjustment, to first loosen the wing nut somewhat, but this results in no inconvenience or danger because such adjustment is a more or less permanent one made by the driver to suit himself and need not be made on the road.

In addition to the above universal movements of the panel, the entire device may be swung horizontally about vertical pivot pin 18. It may be desirable to so swing the device until the panel is in proximity to the window in the left-hand door, thereafter utilizing the panel as a sun-shape or glare shield during the day, particularly when the sun is relatively distant from its noon position.

Due to the light weight of the panel 44 it has no appreciable tendency to overcome, upon vibration and jarring, the frictional resistance of the spring clip and eye-bolt and hence permits the use of a neat and compact connecting device between the arm and the panel bracket.

In spite of the several uses to which the device of this invention may be put, and the plurality of adjustments which may be made it is simple in nature, compact and light, and relatively inexpensive to manufacture.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:—

1. In combination, a supporting arm having a flat lug, a shielding panel, and a device for adjustably attaching said panel to said lug, said device comprising a substantially U-shaped clip receiving said flat lug, a relatively thick block interposed within said clip adjacent said lug, and adjustable means associated with said panel and with said clip, lug and block assembly for supporting the former and maintaining the latter in assembled position.

2. In the combination defined in claim 1, said U-clip comprising a pair of flat resiliently interconnected legs spaced from each other at a distance greater than the combined thicknesses of said lug and said block, whereby the parts of said connecting device are held in frictional engagement.

3. In the combination set forth in claim 1, said block having a recess therein and said clip having a depressed portion nested in said recess, and said adjustable means including a panel-carrying element fitting into said depressed portion and held therein by a pin projecting through the U-clip, lug and block assembly, whereby said panel-carrying element may be oscillated in said depressed portion by swinging the panel.

4. In combination, a supporting arm having a flat end lug, a shielding panel, and a device for adjustably mounting said panel on said lug, said device comprising a clip having parallel and interconnected flat legs, said clip receiving said flat end lug between its legs, a relatively thick block interposed between said lug and one of said legs, said block having an elongated recess therein and one of said clip legs having an elongated depression nested in said recess, a bracket attached to said panel and having a portion thereof fitting into said depression, and a pin or the like connected to said bracket and securing said clip, block and lug in assembled position.

5. In the combination defined in claim 4, said pin carrying an eye, and said bracket portion comprising a rod capable of sliding movement through said eye to permit reciprocatory adjustment of said panel.

6. In the combination specified in claim 4, said panel bracket comprising a rod spaced from said panel and rigidly attached thereto by a pair of offset arms.

7. In the combination set forth in claim 4 said clip being resilient so that its parallel flap legs are, in effect, spring washers, whereby all movements of the panel are resisted by frictional engagement of the elements of said mounting device.

8. In the combination specified in claim 4, adjusting means associated with said pin for varying the frictional engagement of the elements of said mounting device.

In testimony whereof we affix our signatures.

GEORGE E. GAGNIER.
BION C. PLACE.